July 15, 1958
C. J. JOHNSON
2,843,255
CONVEYER APPARATUS
Filed Aug. 31, 1953
2 Sheets-Sheet 1
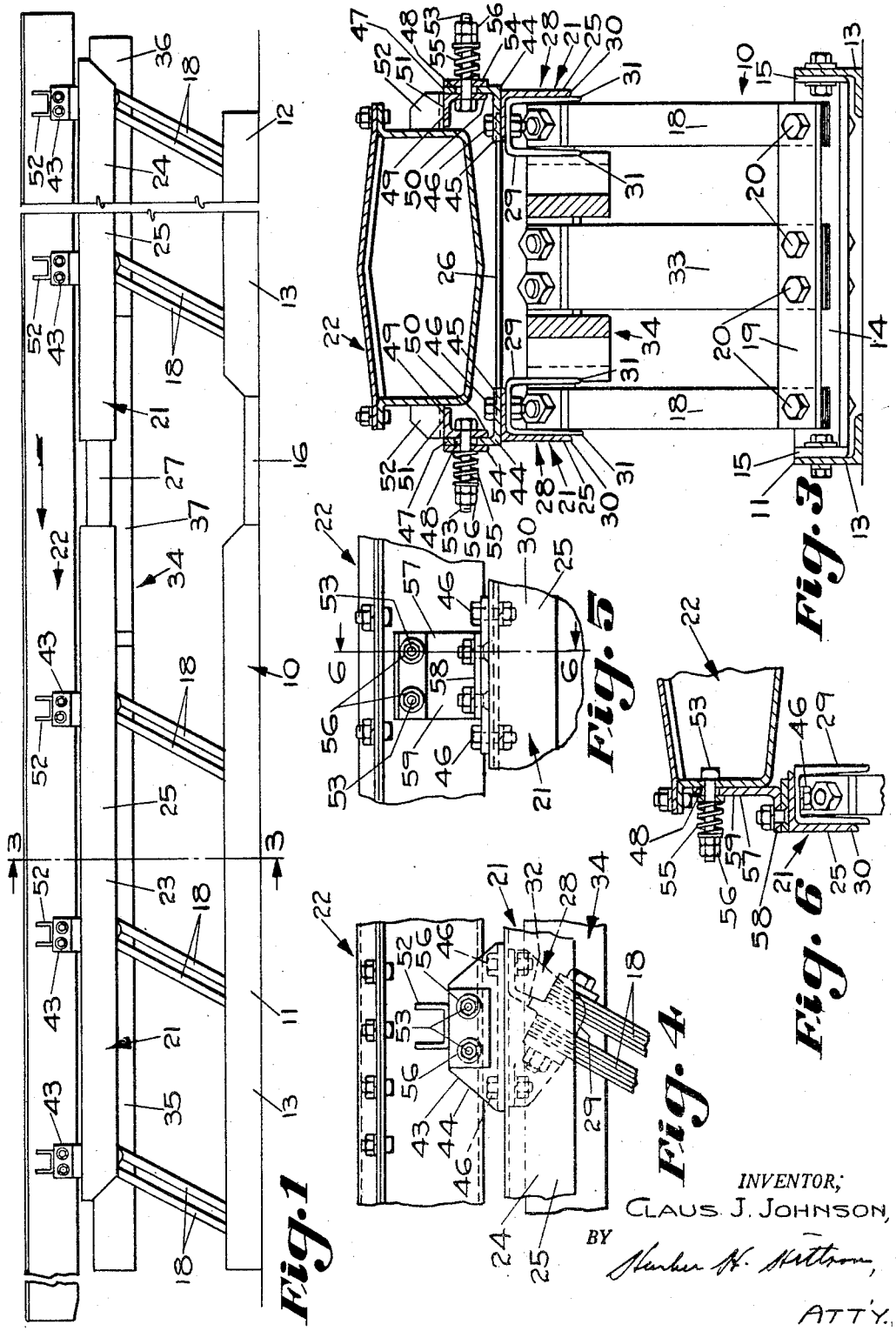
INVENTOR;
CLAUS J. JOHNSON,
BY
ATT'Y.

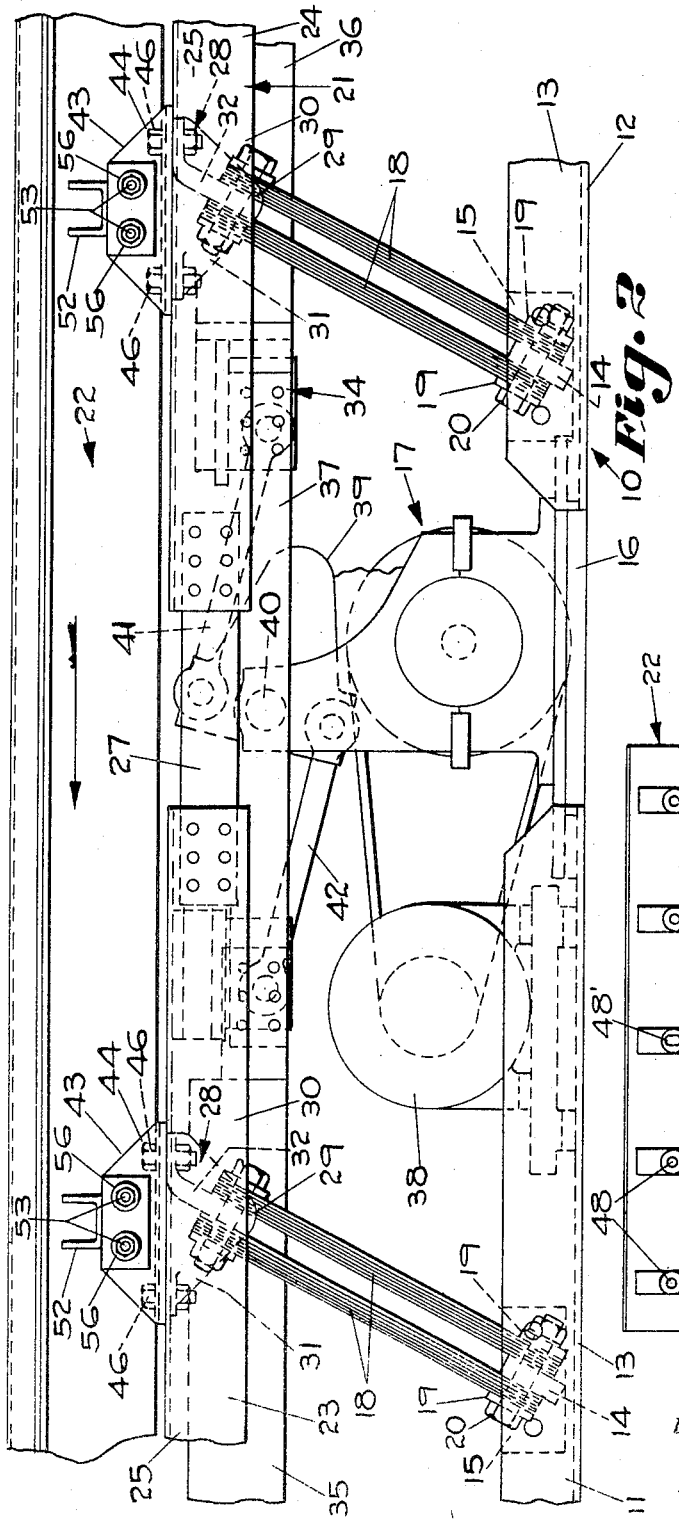

United States Patent Office 2,843,255
Patented July 15, 1958

2,843,255

CONVEYER APPARATUS

Claus J. Johnson, Columbus, Ohio, assignor to The Jeffrey Manufacturing Company, a corporation of Ohio Application August 31, 1953, Serial No. 377,444

7 Claims. (Cl. 198—220)

This invention relates to conveyers that are adapted to convey materials the temperature of which may vary widely from the ambient temperature.

One object of the invention is to provide an improved conveyer of the above mentioned type.

Another object of the invention is to provide an improved apparatus of the above mentioned type wherein provision is made for permitting expansion, contraction, and/or warping of an elongated conveyer means through which materials pass with respect to the means by which the conveyer means is carried.

In carrying out the foregoing object, it is another object of the invention to provide in a vibratory conveyer apparatus including an elongated trough or equivalent conveyer means and a frame means for supporting it, improved means for mounting the trough upon the frame which permits the trough means to expand, contract and warp with respect to its own longitudinal axis and the frame which supports it.

Other objects of the invention will appear hereinafter, the novel features and combinations being set forth in the appended claims.

In the accompanying drawings:

Fig. 1 is a view in side elevation of a conveyer apparatus that includes the invention, the drive mechanism of the conveyer being omitted for the sake of clarity;

Fig. 2 is a view on a larger scale of a portion of the apparatus seen in Fig. 1 and showing particularly the drive mechanism of the apparatus;

Fig. 3 is a view in section, the section being taken on line 3—3 of Fig. 1;

Fig. 4 is a view in elevation of a fragment of the conveyer seen in Fig. 1, the view showing one of the mechanisms by which the conveyer trough is mounted or connected to its supporting frame and a part of one of the resilient means that supports the frame;

Fig. 5 is a view similar to Fig. 4 but showing a different mechanism for mounting or connecting the trough to its supporting frame;

Fig. 6 is a view in section, the section being taken on line 6—6 of Fig. 5;

Fig. 7 is a diagrammatic view of parts of the conveyer apparatus seen in Fig. 1, showing one arrangement of mounting means for connecting the conveyer element to its supporting frame; and Fig. 8 is a diagrammatic view of parts of two conveyer apparatuses, each being similar to the conveyer seen in Fig. 1, one feeding the other, and showing another arrangement of the mounting means that connects the conveyer troughs to their supporting frames.

In Fig. 1 of the drawings there is shown one of the numerous forms of conveyer apparatus that may include this invention. The conveyer shown is of the mechanically vibrated type and it is adapted to convey very hot materials, such as sintered ores and the like, and it includes a main frame 10 that forms the conveyer base which may be suitably anchored to the floor of a building or the like. The main frame 10 is built up of a pair of substantially identical sections 11 and 12, each of which includes a pair of laterally spaced angle members 13 interconnected at spaced intervals throughout their lengths by cross bars 14 of rectangular cross section. Each cross bar 14 includes a pair of end plates 15 that are bolted to the upright flanges of the angle members 13. Main frame sections 11 and 12 are interconnected by a plate 16 upon which there is mounted a drive assembly 17, the function of which is hereinafter pointed out.

At each end of each of the cross bars 14 and on opposite sides thereof there is a pair of cantilever spring bars 18 that extend upwardly substantially at an angle of 28° to the vertical. These cantilever spring bars 18 are clamped to the cross bars 14 by clamp strips 19 that extend parallel to the cross bars 14 and terminate over the bottom ends of cantilever spring bars 18. Bolts 20 extend through the clamp strips 19, the cantilever spring bars 18, and the cross bars 14 to clamp these elements together.

All of the cantilever bars 18 are canted in the same direction and their tops are connected together by a frame or carrier 21 upon which there is mounted a conveyer in the form of a conveyer trough, pan or tube 22 through which the materials being conveyed travel. Frame or carrier 21 includes a pair of frame sections 23 and 24, each of which is formed by a pair of spaced parallel angle members 25 interconnected by transversely extending bars 26, and these frame sections 23 and 24 are connected in end to end relation by bars or straps 27 to form the two sections 23 and 24 into the single frame or carrier 21.

Frame or carrier 21 is supported upon the upper ends of cantilever spring bars 18 through a plurality of mounting devices 28, all of which are identical in construction and one of which will now be described. As seen in Figs. 3 and 4 of the drawings, the angle member 25 of frame 21 has bolted to it an inverted U-shaped saddle 29 that seats upon and is bolted to the underside of the horizontally inwardly extending flange or leg of angle member 25 and which at one side abuts its downwardly extending flange or leg 30. Side legs 31 of saddle 29 shroud the top portions of the cantilever bars 18 and a mounting element 32 through which the angle and the cantilever bars 18 are connected.

From the description thus far given it will be apparent that the conveyer apparatus includes an elongated base frame 10 that may be mounted upon the floor of a building or the like and an elongated trough carrying frame 21 that extends generally parallel to the base frame 10 and is mounted above it by a plurality of cantilever spring bars 18, which latter may be flexed in a direction parallel to the longitudinal axes of the frames 10 and 21 whereby the entire unit will act in the nature of a parallelogram structure.

Each of the cross bars 14 also carries a third pair of cantilever spring bars 33 (see Fig. 3) that are spaced between the cantilever springs bars 18. The upper ends of these cantilever spring bars 33 carry a counterweight assembly 34 which includes two sections 35 and 36 mounted in end to end relation and extending longitudinally below the frame or trough carrier 21 and between the cantilever spring bars 18. The adjacent ends of counterweight assembly sections 35 and 36 are rigidly interconnected by a pair of bars or straps 37 to form the sections 35 and 36 into the single counterweight or unit 34.

The drive assembly 17 is driven by a motor 38 through belts and this drive assembly includes what is in effect a triple armed lever 39 that is rocked or oscillated about its mounting pin 40. The uppermost arm of lever 39 is connected through a connecting rod 41 and suitable wrist pins and bracket structure to one end of counterweight section 36, and the lower arm of lever 39 is connected by a somewhat similar structure including a connecting rod 42 to the frame or trough carrier 21. When motor 38 is operating, the lever 39 is rocked or oscillated through its third arm about pin 40 by mechanism within the drive assembly 17. This action of the lever 39 causes the counterweight to be moved in one direction while the frame or trough carrier 21 is moved in the opposite direction.

It has been found in practice that when material having a temperature which differs widely from the ambient temperature is conveyed through a conveyer trough, pan or tube, such as trough, pan or tube 22, the trough, pan or tube may not only expand or contract along its longitudinal axis but that it may also warp with respect to or along this axis and particularly in a vertical plane. Obviously, expansion and contraction is caused by changes in temperature of the trough, pan or tube and apparently the above described warping of the trough, pan or tube with respect to its longitudinal axis is caused by reason of the difference in temperatures between, for example, the bottom and top portions of the trough, pan or tube.

It has also been found in practice that the above described expansion and contraction, coupled with warping, which latter results generally in the trough, pan or tube bowing in a vertical plane, frequently causes failure of the conveyer apparatus in that such action of the trough, pan or tube may bend the trough, pan or tube thereby causing it to break away from its mounting means or to break the mounting means themselves. By this invention provisions are made for permitting the trough, pan or tube to expand and contract and warp or bow without resulting in any damage to any part of the conveyer apparatus, and also to control or prevent motion of the trough, pan or tube at one or more positions along its length.

By reference to Fig. 1 of the drawings it will be seen that the trough, pan or tube 22 is mounted to its frame or carrier 21 at a plurality of points or positions spaced along its length by a plurality of generally similar connectors or mounting structures indicated by the numeral 43, one of which is preferably positioned directly above each of the mounting devices 28 through which frame or carrier 21 is mounted to the tops of cantilever spring bars 18.

Each of the connectors or mounting structures or devices 43 includes an angle member 44 that has its bottom leg 45 resting upon the top of angle member 25 of the frame or trough carrier 21 to which it is bolted by a pair of bolts 46. The other leg 47 of angle member 44 extends upwardly vertically and generally parallel with the upright leg of frame or carrier angle 25 and it is drilled or punched as at 48 to form a pair of side by side openings which may be either circular or elongated openings, depending upon the position that the connector or mounting structure 43, of which it is a part, is to occupy along the length of the conveyer trough, pan or tube 22 and the function it is to perform as described hereinafter. For the purpose of this description it will be assumed that the openings 48 in the structure seen in Figs. 2 and 3 of the drawings are circular.

The connector or mounting structure 43 includes a second angle member 49 having a leg 50, the outer surface of which abuts and frictionally engages the inner vertical surface of leg 47 of the angle member 44. The uppermost leg 51 of member 49 lies substantially in a horizontal plane and extends toward the upright side of conveyer trough, pan or tube 22 and it is welded to the bottom of an inverted channel-like support, arm or bracket 52, the inner end of which is welded to the upright side wall of conveyer trough, pan or tube 22.

The upright leg 50 of angle member 49 is drilled or otherwise pierced to form a pair of openings through which bolts 53 may be inserted. Bolts 53 extend through the circular openings 48 in leg 47 of angle member 44 substantially on the axis of each of said openings 48 when the temperatures of all of the elements of the apparatus correspond, and the extending ends of bolts 53 receive a large washer or plate 54 which abuts and frictionally engages the outer upright friction surface of leg 47 of member 44, a relatively strong compression spring 55, a washer, and a pair of nuts, all of which are indicated in the drawings by the numeral 56. Friction between the surfaces of the legs 47 and 50 and the washers 54 and leg 47 may be determined by adjusting the pressure on springs 55 through nuts 56.

It will be seen that because the diameter of each opening 48 is considerably greater than the diameter of bolt 53 that extends through it that the connector or mounting structure 43 forms a slip joint which permits relative motion of the angle members 44 and 49, and consequently relative motion between the frame 21 and trough, pan or tube 22, in any direction in a vertical plane. When it is desired that the connector or mounting structure 43 limit the action of the slip joint to one direction, then the opening 48 may be in the form of a slot, the opposite sides of which abut the body of bolt 53.

Whenever it is desired that the trough, pan or tube 22 should not shift bodily longitudinally with respect to frame or carrier 21, then one pair of mounting structures 43 located at any given position along the length of the trough 22 and at opposite sides thereof will be caused to include slotted openings 48' that extend generally vertically and the sides of which abut the bolts 53 (see Fig. 7, where for the sake of clarity each mounting structure is shown as including only one opening 48 or 48'). These upright slots 48' will permit upward and downward movement of that portion of the trough where they are located, but they prevent longitudinal shifting of it with respect to frame or carrier 21.

It frequently occurs in actual practice that the conveyer apparatus shown in Fig. 1 of the drawings may be employed to feed material into another identical conveyer, as indicated diagrammatically in Fig. 8. When such is the case it may be desirable to cause the connectors or mounting structures 43 at the adjacent ends of the adjacent conveyer trough, pan or tube 22 to include slotted openings 48" that extend horizontally therein, thereby to prevent, to a large extent, upward and downward shifting of the adjacent ends of the conveyer trough, pan or tube 22 relative to their supporting frames or carriers 21, thereby avoiding interference, such as the striking of one conveyer trough, pan or tube with the other when the apparatuses are operating.

From the foregoing it will be obvious that any combination of connectors or mounting structures 43, including as desired circular openings 48 or slotted openings 48' and/or 48", may be employed to permit expansion, contraction and warping of the conveyor trough, pan or tube with respect to its mounting frame or carrier 21, and that the connectors or mounting structures 43 including slotted openings 48, 48' and 48" may be placed at one or more positions along the length of the conveyer trough, pan or tube 22 to control positively the direction or action of movement of the trough, pan or tube 22 with respect to its mounting frame or carrier 21 at those particular positions.

In Figs. 5 and 6 of the drawings there is shown a modified form of connector or mounting structure that may be employed to mount the conveyer trough, pan or tube 22 about its supporting frame or carrier 21. This particular mounting structure includes a bracket 57 having a foot 58 that rests upon the top of a plate bolted to the top angle member 25 of the frame or carrier 21, and an upright leg 59 that frictionally engages an upright side wall of the trough, pan or tube 22. The leg 59 is provided with openings, such as the openings 48, 48' or 48", and bolts 53 extend through these openings in the side wall of trough 22, the openings 48, 48' or 48", as the case may be, and the washer or plate 54, to receive springs 55 and washers and nuts 56. It is to be understood that these mounting structures may be substituted for the mounting structures 43 and will be employed in the identical capacity as the mounting structures 43, namely, to provide for the expansion, contraction and warping of the conveyer trough, pan or tube 22.

From the foregoing it will be seen that this invention provides a conveyer for conveying materials, the temperature of which may vary from the ambient temperature and thereby cause expansion, contraction and warping of the conveyer trough, pan or tube along its longitudinal axis and with respect to the means that support it, means which mount the conveyer trough, pan or tube upon its mounting or carrying means which will permit said expansion, contraction and warping of the trough, pan or tube with respect to its own longitudinal axis as well as with respect to a means which carries it, whereby damage cannot occur to any of the parts of the conveyer by reason of the expansion, contraction and warping of the trough, pan or tube. It will also be seen that by this invention, means is provided for directing the motion of the trough, pan or tube at predetermined positions along its longitudinal axis, particularly for the reasons of preventing, for example, longitudinal bodily shifting of the trough, pan or tube with respect to its mounting means, and the vertical and/or longitudinal shifting of one end of the conveyer trough, pan or tube with respect to the mounting or carrying means therefor. Obviously various combinations of openings 48, 48' and 48" may be employed in the same conveyer apparatus to accomplish the above described results.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A vibratory conveyer mechanism for conveying material the temperature of which may vary widely from the ambient temperature including an elongated trough through which said material is conveyed, an elongated frame means for supporting said trough adapted to vibrate therewith, means interconnecting said trough and said frame means at at least one position along their lengths for controlling the expanding and contracting direction of motion thereof, and other means connecting said trough means and said frame means spaced along the length thereof and including means providing for relative movement between them caused by expansion, contraction and warping of said trough means.

2. A vibratory conveyer mechanism for conveying material the temperature of which may vary widely from the ambient temperature including an elongated trough through which said material is conveyed, an elongated frame means for supporting said trough adapted to vibrate therewith, means interconnecting said trough and said frame means at at least one position along their lengths for controlling the expanding and contracting direction of motion thereof, and other means connecting said trough means and said frame means providing for relative movement between them caused by expansion, contraction and warping of said trough means.

3. A vibratory conveyer mechanism for conveying material the temperature of which may vary widely from the ambient temperature including an elongated conveyer means through which said material passes, an elongated frame means for supporting said conveyer means adapted to vibrate therewith, means interconnecting said conveyor means and said frame means at at least one position along their lengths for controlling the expanding and contracting direction of motion thereof, and other means connecting said conveyer means and said frame means spaced along the length thereof and including means providing for relative movement between them caused by expansion, contraction and warping of said conveyor means.

4. A vibratory conveyer mechanism for conveying material the temperature of which may vary widely from the ambient temperature including an elongated conveyer means through which said material passes, an elongated frame means for supporting said conveyor means adapted to vibrate therewith, means interconnecting said conveyer means and said frame means at at least one position along their lengths for controlling the expanding and contracting direction of motion thereof, and other means connecting said conveyer means and said frame means providing for relative movement between them caused by expansion, contraction and warping of said conveyer means.

5. A conveyer for conveying material the temperature of which may vary substantially from the ambient temperature including a frame, means for vibrating the frame, conveyer means through which the material passes, means mounting said conveyer means on said frame for vibration therewith to move the material, said mounting means including connection means comprising elements having abutting portions uniting the conveyer means with the frame for vibration therewith, said elements including a lose joint for expansion, contraction and warping of said conveyer means with respect to the frame.

6. A conveyer for conveying material the temperature of which may vary substantially from the ambient temperature including a frame, means for vibrating the frame, conveyer means through which the material passes, means mounting said conveyer means on said frame for vibration therewith to move the material, said mounting means including connecting means uniting the conveyer means with the frame for vibration therewith and including elements on the frame and on the conveyor means having surfaces abutting each other, and means joining said elements with said surfaces abutting each other, said elements including a loose joint permitting expansion, contraction and warping of said conveyor means with respect to the frame.

7. A conveyer for conveying material the temperature of which may vary substantially from the ambient temperature including a frame, means for vibrating the frame, conveyer means through which the material passes, means mounting said conveyer means on said frame for vibration therewith to move the material, said mounting means including connecting means uniting the conveyer means with the frame for vibration therewith and including elements on the frame and on the conveyer means having surfaces abutting each other, and bolt means extending through said elements joining said elements with said surfaces abutting each other, said frame elements being loose on the bolt means forming a loose joint permitting expansion, contraction and warping of said conveyer means with respect to the frame.

References Cited in the file of this patent

UNITED STATES PATENTS

| | | |
|---|---|---|
| 2,173,682 | Fahrenwald | Sept. 19, 1939 |
| 2,458,077 | Jacobsen | Jan. 4, 1949 |
| 2,638,206 | Musschoot et al. | May 12, 1953 |
| 2,664,995 | Renner | Jan. 5, 1954 |
| 2,669,344 | Flint | Feb. 16, 1954 |